(12) United States Patent  
Ren (10) Patent No.: US 6,492,052 B2  
(45) Date of Patent: *Dec. 10, 2002

(54) AIR BREATHING DIRECT METHANOL FUEL CELL

(75) Inventor: Xiaoming Ren, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 74 days.

This patent is subject to a terminal disclaimer.

(21) Appl. No.: 09/726,836

(22) Filed: Nov. 30, 2000

(65) Prior Publication Data

US 2002/0064698 A1 May 30, 2002

Related U.S. Application Data

(60) Provisional application No. 60/172,856, filed on Dec. 17, 1999.

(51) Int. Cl.[7] .................................................. H01M 8/10
(52) U.S. Cl. ............................ 429/33; 429/41; 429/42
(58) Field of Search ............................ 429/30, 33, 41, 429/42

(56) References Cited

U.S. PATENT DOCUMENTS

| 4,390,603 | A | | 6/1983 | Kawana et al. ................ 429/30 |
| 4,478,917 | A | * | 10/1984 | Fujita et al. ................... 429/33 |
| 4,562,123 | A | * | 12/1985 | Shimizu et al. ................ 429/27 |
| 5,472,799 | A | | 12/1995 | Watanabe ...................... 429/30 |
| 5,545,492 | A | | 8/1996 | Zito ............................. 429/29 |
| 5,573,866 | A | * | 11/1996 | Van Dine et al. .............. 429/13 |
| 5,643,690 | A | | 7/1997 | Tateishi et al. ................ 429/34 |
| 5,773,162 | A | | 6/1998 | Surampudi et al. ........... 429/39 |
| 5,776,624 | A | | 7/1998 | Neutzler ....................... 429/26 |
| 5,992,008 | A | | 11/1999 | Kindler ........................ 29/730 |

* cited by examiner

Primary Examiner—John S. Maples  
(74) Attorney, Agent, or Firm—Ray G. Wilson (57) ABSTRACT

An air breathing direct methanol fuel cell is provided with a membrane electrode assembly, a conductive anode assembly that is permeable to air and directly open to atmospheric air, and a conductive cathode assembly that is permeable to methanol and directly contacting a liquid methanol source.

10 Claims, 7 Drawing Sheets

AIR BREATHING DIRECT METHANOL FUEL CELL

BENEFIT OF PRIOR APPLICATION

This application claims the benefit of the filing date of U.S. Provisional Application No. 60/172,856, filed Dec. 17, 1999.

STATEMENT REGARDING FEDERAL RIGHTS

This invention was made with government support under Contract No. W7405-ENG-36 awarded by the U.S. Department of Energy. The government has certain rights in the invention.

FIELD OF THE INVENTION

The present invention relates generally to fuel cells, and, more particularly, to air breathing direct methanol fuel cells.

BACKGROUND OF THE INVENTION

As portable consumer electronics become increasingly popular, there is a strong demand for long lasting portable power sources in the range of a few hundred milliwatts to a few watts range. At present, these demands are largely, met by various types of batteries. Often, these batteries are very expensive, short-lived and all have disposal problems.

Methanol fuel cells are a promising technology for these types of battery replacement applications. Methanol, as the fuel, has a high energy density and is easily obtained, stored and transported. Direct methanol fuel cells and stacks with forced airflow on the cathode side and forced methanol flow on the anode side have been under development at Los Alamos National Laboratory for the past 5 years, both for portable power and for transportation applications. Usually, this type of direct methanol fuel cell works at elevated temperature, requiring various auxiliary components and a rather complicated control system. Such a direct methanol fuel cell does not fit the requirements for the low power battery replacement applications.

For such applications using a direct methanol fuel cell, the key challenges are to provide acceptable power output, high energy conversion efficiency, and high energy density with the cell operated in convenient conditions to the user. The typical desired operating condition are, for example, an operating temperature near room temperature, no forced air flow, no re-circulation methanol pump, and no water recovery system. In the present invention, a direct methanol fuel cell is passive, i.e., operates under no forced air (i.e., air breathing) at near room temperature. This type of cell is referred to herein as an air breathing direct methanol fuel cell (air breathing DMFC).

Various aspects of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the present invention includes an air breathing direct methanol fuel cell having a membrane electrode assembly, a conductive cathode assembly permeable to air and directly open to atmospheric air, and a conductive anode assembly permeable to methanol and directly contacting a mixture of liquid methanol and water.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

Figure 1:
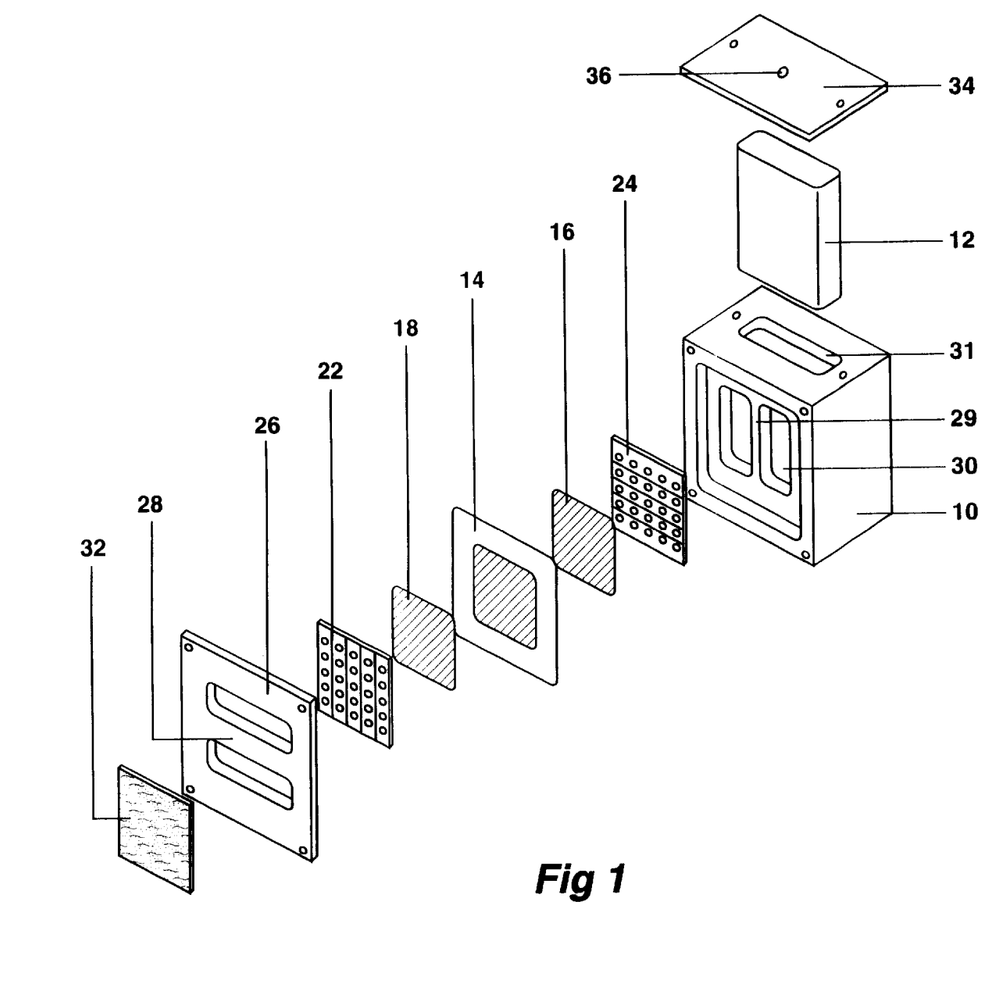
FIG. 1 is an exploded view of a fuel cell unit according to one embodiment of the present invention.

FIG. 1 depicts the cell components for an air breathing direct methanol fuel cell unit with only one cell shown in exploded view. An identical cell can be placed in mirror image within cell body 10 (see, e.g., FIG. 5) with an anode backing contacting methanol reservoir 12. Reservoir 12 may be a sponge, or the like, filled within container 31 to retain the methanol solution within container 31 if the cell is oriented adversely. Each cell consists of a membrane electrode assembly 14, anode backing 16 and cathode backing 18, metal current collectors 22, 24, compression cover plate 26, reinforcement bars 28 and 29, air side filter 32, methanol solution container 31 formed by the body of cell 10, methanol reservoir 12, and cover 34 with methanol solution injection and $CO_2$ ventilation port 36. Each of these components is further described in detail below.

Membrane Electrode Assembly (MEA) 14:

MEA 14 was formed by applying anode ink and cathode ink directly onto a polymer proton conducting membrane, such as a polymer electrolyte membrane, a Nafion® 117 membrane in particular, over a vacuum table at 60° C. The anode ink was made from high surface area PtRu catalyst powder and Nafion ionomer solution of 1200 E.W. (N1200 E.W.), and the cathode ink from high surface area Pt catalyst powder and N1200 E.W. ionomer solution. The dry anode and cathode inks preferably contain 15±10 wt. % and 10±5wt. % Nafion® components, respectively. A more complete description of the electrode inks and methods of application are set out in U.S. Patent Application entitled "Catalyst Inks for Direct Methanol Fuel Cells" (Docket No. S-94,635, pending U.S. patent application Ser. No. 09/715,211, filed Nov. 14, 2000), filed concurrently herewith and incorporated herein by reference.

Because of the low temperature and low cell current density involved in this application, membranes that are less expensive and that are less permeable to methanol can be used. Examples of this type of membranes are the partially fluorinated ionomeric membranes: IonClad® R-1010 and R-4010, both manufactured by Pall Company. These membranes are considerably less permeable to methanol, while exhibiting proton conductivity approximately equal to that of Nafion 117. In addition to the methanol permeation rate and protonic conductivity, the electro-osmotic drag characteristic of a membrane is also an important property that needs to be considered in order to minimize the water loss from the cell during operation.

Anode Backing 16:

E-tek 2.02 hydrophilic single-sided carbon cloth backing (only one side of the carbon cloth is coated with felt made from carbon powder and polytetrafluoroethylene (PTFE) polymer) contacted the anode side active area of MEA 14. The criteria for selecting a suitable anode backing is described in U.S. Patent Application, Enhanced Methanol Utilization in Direct Methanol Fuel Cells, Ser. No. 09/472,387, now U.S. Pat. No. 6,296,964, issued Oct. 2, 2001, incorporated herein by reference, and can be applied here to achieve a high fuel utilization efficiency without sacrificing the fuel cell performance.

Cathode Backing 18:

E-tek double-sided carbon backing (both sides of the carbon cloth are coated with felt made from carbon powder and PTFE polymer) designated as NC/DS/V2 was used to contact the cathode side active area of MEA 14. The desired hydrophobicity of the cathode backing provided by the PTFE component is based on the operating principle of the gas diffusion electrode, which allows a ready access of air to the catalyst surface through the gas diffusion channels within the backing electrode.

Metal Current Collectors 22, 24:

Current collectors 22, 24 were made from perforated metal sheets, which were corrugated, into folds of ridges and valleys, as described in U.S. Patent Application, Flow Channel Device for Electrochemical Cells, Ser. No. 09/472,388, filed Dec. 23, 1999, now abandoned, and incorporated herein by reference. The corrugations give the metal current collectors mechanical strength against bending stress arising from compressing the MEA, and the perforations create the openness to allow the reactants (methanol and air) to reach the catalyst layers, and to allow the reaction product ($CO_2$) to leave the anode catalyst layer while uniformly distributing methanol and air over the facing surface areas of the corresponding conductive electrodes. In this application, the perforated area covers up to 50% of the total metal sheet area. In an assembled methanol fuel cell, the cathode metal current collector 22 compresses the cathode backing 18, MEA 14, and the anode backing 16 against the anode metal current collector 24. Metal current collectors 22, 24 are placed in an orthogonal relationship along their corrugation folds, which are indicated by solid lines in FIG. 1.

Compression Reinforcement Bar 28, 29:

Metal current collectors 22, 24 are further compressed between compression plate 26 containing reinforcement bar 28 and a recess within cell body 10 that defines openings to a methanol volume 31 and that also has a reinforcement bar 29. The space between bars 28, 29 is more widely separated than the corrugation folds of the metal current collectors 22, 24. Reinforcement bars 28, 29 run perpendicular to the respective corrugation folds of metal current collectors. The assembly consisting of MEA 14 sandwiched by anode backing 16 and cathode backing 18, and metal current collectors 22, 24 is a unit cell assembly.

Air Side Filter 32:

The air side filter 32 is, e.g., a piece of porous polypropylene paper of 10 mil thickness, covering the openings in compression plate 26. Outside air passes through filter 32 to reach cathode backing 18 and the cathode catalyst layer of MEA 14. In one embodiment, filter 32 is highly hydrophilic to allow air movement through the filter while minimizing water vapor loss from the cathode through filter 32 to the atmosphere. Filter 32 serves the purpose of keeping dust particles outside the unit cell assembly and retaining water moisture within the unit cell, while allowing the natural diffusion of air that contains the oxygen reactant to MEA 14.

Methanol Solution Container 31:

A methanol solution container 31 is defined by cell body 10 and cover 34.

Methanol Reservoir 12:

A methanol reservoir 12 is placed within the methanol solution container to retain methanol and is compressed to place the sponge and the methanol within container 31, while permitting methanol access to MEA 14 through anode current collector 24 and anode backing 16. In one embodiment, an absorbing sponge of suitable porosity and chemical inertness toward the methanol solution, or the like, is used to soak up methanol, where the sponge within container 31 is compressed to place the sponge and the methanol absorbed therein in contact with adjacent anode current collector 24 and anode backing 16. By constraining the free flow of methanol solution within the container, the methanol fuel cell can be operated in all orientations. Such a feature is highly desirable in a portable power device.

Methanol Solution Injection and $CO_2$ Ventilation Port 36:

A small opening 36 through cell cover 34 is provided for both refilling the cell with a methanol solution and venting the $CO_2$ reaction product.

Figure 2:
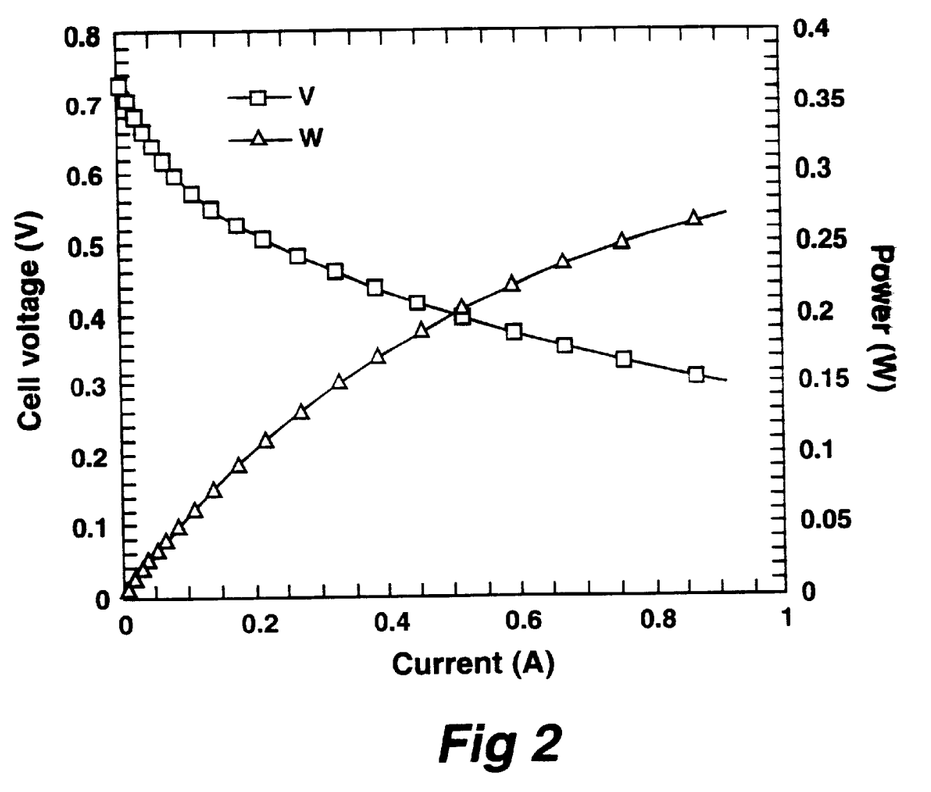
FIG. 2 graphically depicts the room temperature performance of a single air breathing DMFC as shown in FIG. 1.

One type of test cell was a single cell with a circular shaped active electrode area of 11.4 $cm^2$ formed as described above. Air cathode 18 is operated by the natural diffusion of oxygen in the air to the cathode catalyst layer, and the methanol anode 16 directly contacts the methanol solution contained in methanol reservoir 12 with no active mechanical devices required for reactant supply. In an alternate embodiment, a methanol solution may be mechanically supplied to maintain the concentration of the methanol in the solution. The performance reported here was obtained at room temperature (22° C.) and with 0.76 atm air, obtained at Los Alamos altitude of 7200 feet above sea level. Under prolonged operation, the cell temperature became stable at 27° C. under these test conditions. FIG. 2 shows the curves of cell voltage and power output vs. current, obtained at a cell voltage scan rate of 2 mV/s.

Figure 3:
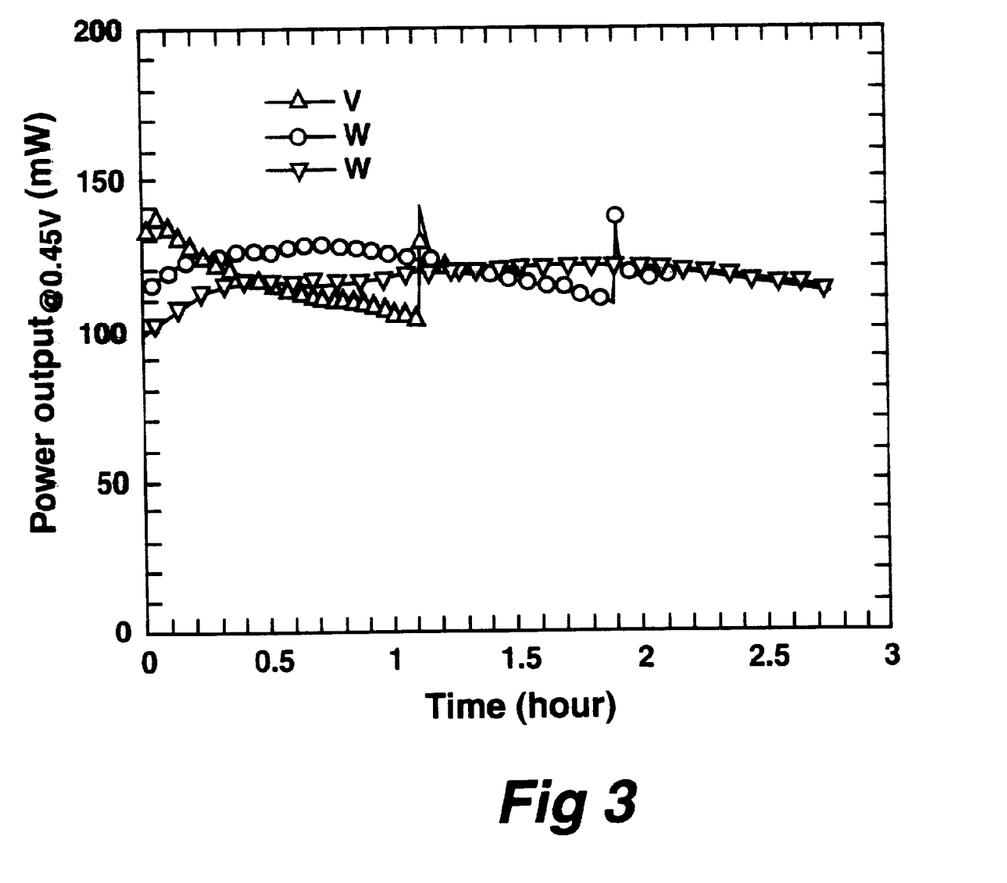
FIG. 3 graphically depicts cell power outputs at 0.45 V with 16 mL methanol solutions of 1.0, 1.5, and 2.0 M at the start of a test run.

FIG. 3 shows the power output of this cell at 0.45 V over a period of time when operated at concentrations of methanol of 1.0 M, 1.5 M, and 2.0 M. The power output "spikes" appeared when the cell was briefly shaken during the test.

Figure 4:
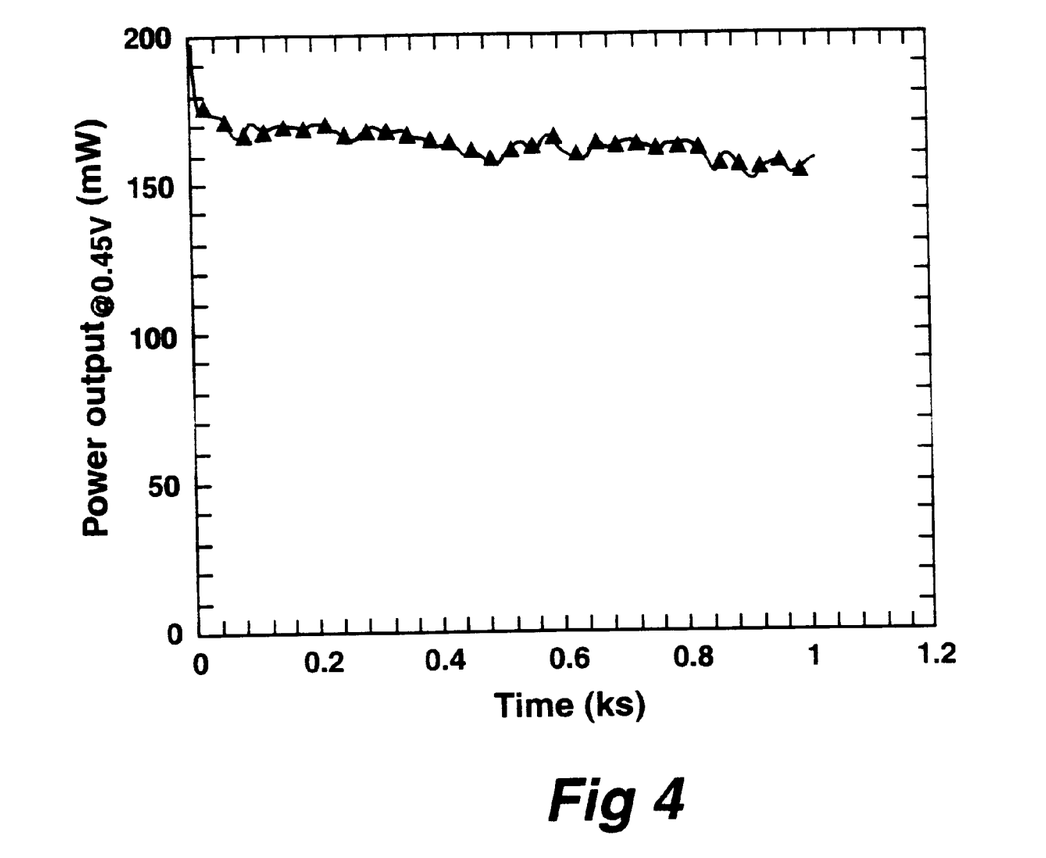
FIG. 4 graphically depicts cell power output at 0.45 V with 16 mL 1.0 M methanol solution at the start of the test where a different membrane electrode assembly (MEA) is used than for the performance shown in FIG. 3.

FIG. 4 shows the performance of a second cell for the power output at a cell voltage of 0.45 V under the same testing conditions as shown in FIG. 3. The better cell performance was achieved by using a more activated MEA. It was found that the MEA can be more effectively activated by conditioning the MEA before operation with methanol: the MEA, sandwiched by anode and cathode backings in a compressed fuel cell hardware, was run at 80° C. with humidified hydrogen feed at the anode and air feed at the cathode at 0.7 V for over 3 hours. Noticeable increases in anode and catalyst layer protonic conductivity (measured using an electrochemical impedance spectroscopic method) and the methanol electro-oxidation activity (anode polarization against a hydrogen evolution counter electrode in a humidified H2 atmosphere) were observed after the activation conditioning.

Figure 5:
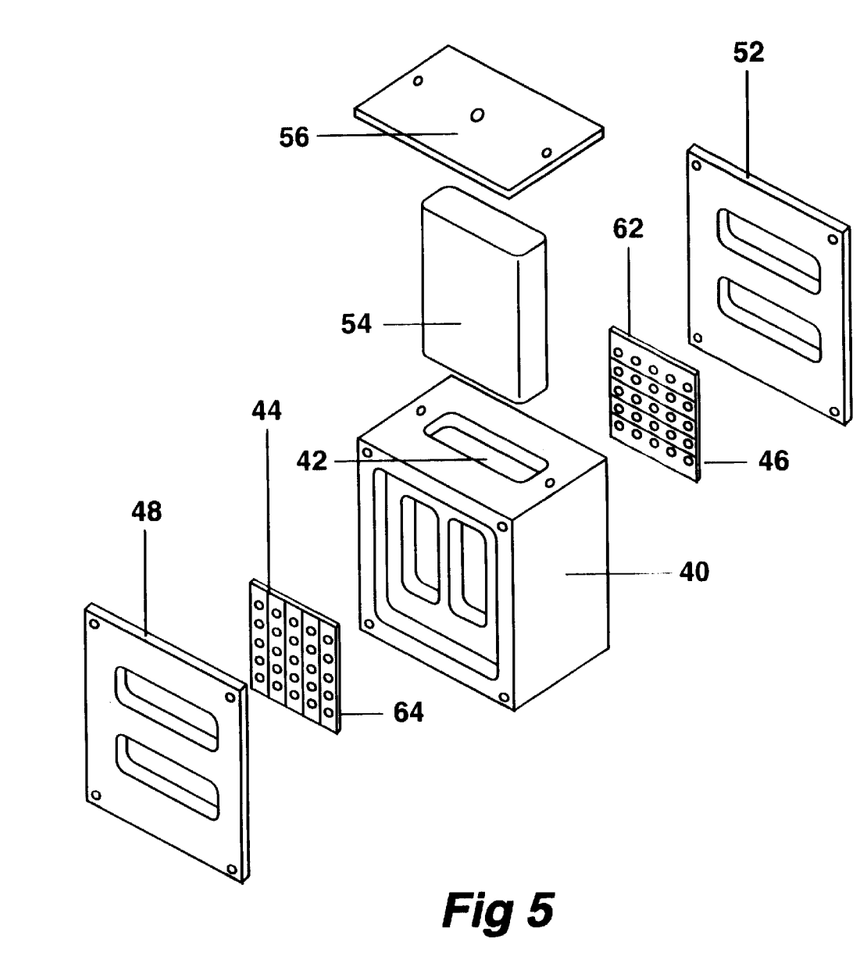
FIG. 5 is an exploded view of an air breathing DMFC with two cells connected in series.

A second type air breathing methanol fuel cell has also been demonstrated. FIG. 5 illustrates a two-cell assembly 44, 46, each of which has a square shaped active electrode area of 5 cm$^2$. These two unit cell assemblies 44, 46, located on the two major faces of cell body 40, have opposed anode surfaces 62, 64, each of which contacts the central methanol container 42 defined by cell body 40 and cover 56. Each cell assembly 44, 46 is clamped to cell body 40 by a compression plate 48, 52, respectively.

Higher cell voltage output was achieved by connecting the anodes and cathodes of two electrode assemblies in series. Thus the positive terminal is connected to the first cell cathode, the first cell anode is connected to the second cell cathode and the second cell anode becomes the negative terminal. The air cathode is operated by the natural diffusion of oxygen from atmospheric air to the cathode catalyst layer, and the methanol anode side is exposed to the methanol solution contained in the methanol reservoir 54 in container 42. This configuration provides an entirely passive unit with no external devices required for reactant feed, although a supply system could be included to maintain the methanol concentration in the reservoir and . The two anodes share the same methanol supply from the reservoir.

Figure 6:
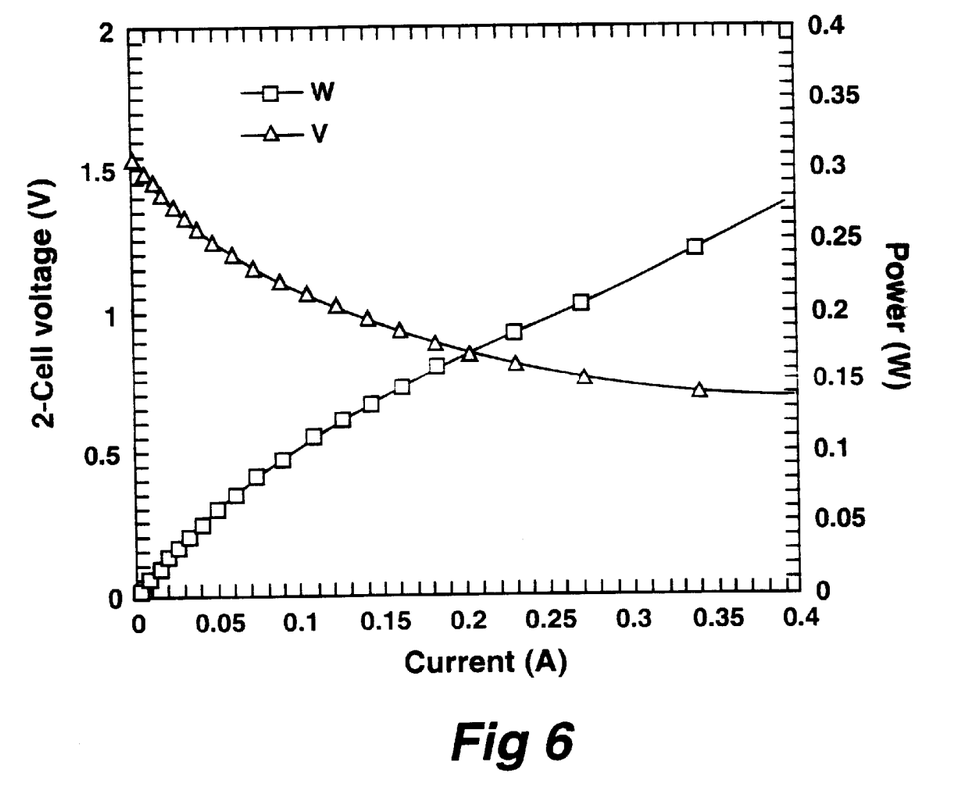
FIG. 6 graphically depicts the voltage and power performance of the unit shown in FIG. 5 at room temperature with a 1.0 M methanol solution.
Figure 7:
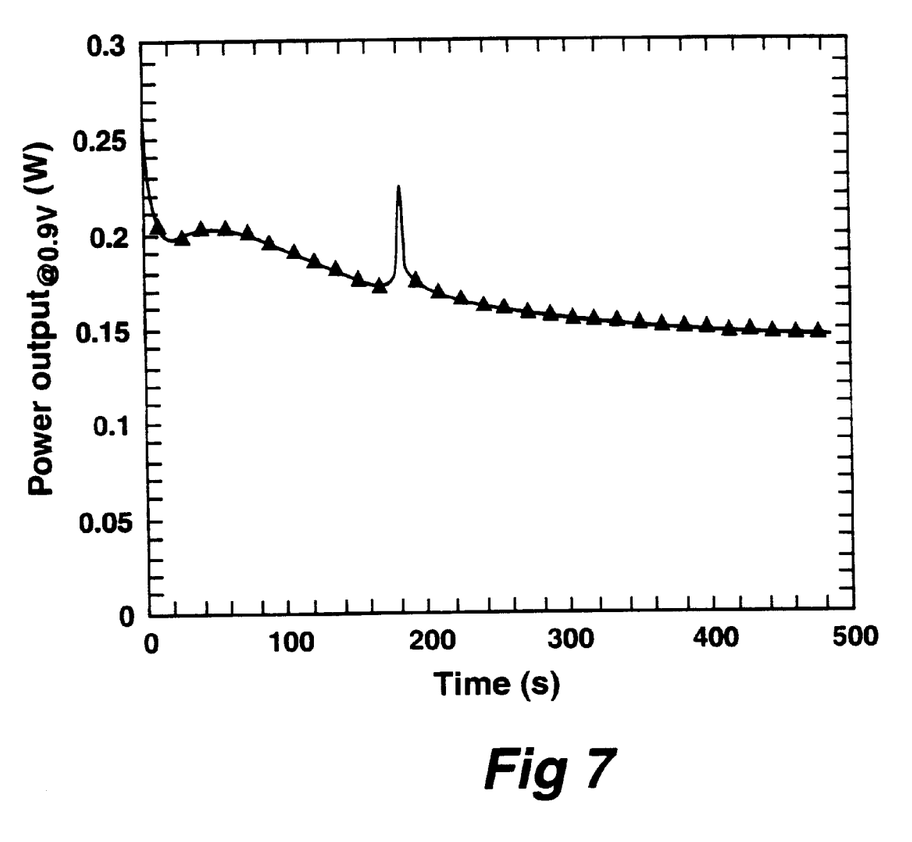
FIG. 7 graphically depicts cell power output of the unit shown in FIG. 5 at 0.90 V with 10 mL of 1.0 M methanol solution at the start of the run.

The performance reported here was obtained at room temperature and with 0.76 atm air, obtained at Los Alamos altitude at 7200 feet above sea level. With prolonged operation, the cell temperature became stable at 27° C. under these test conditions. FIG. 6 shows the curves of the cell voltage and power output vs. current, obtained at a cell voltage scan rate of 4 mV/s with a methanol solution of 1.0 M MeOH. FIG. 7 shows the power output of this unit at 0.90 V with an initial fuel loading of 10 mL 1.0 MeOH placed within the methanol container 42.

Membrane Resistance:

The unit cells described herein exhibited membrane resistance as high as 0.8 Ω cm$^2$, which is acceptable, when the cell cathode is exposed to outside air in normal cell operating conditions. With water vapor saturated air, the membrane resistance decreased to 0.6 Ω cm$^2$, and with liquid water contacting the cathode side, the membrane resistance was further decreased to 0.25 Ω cm$^2$. The high membrane resistance observed indicates that the membrane was drying out under the operating conditions, especially at the low cell current density produced in this cell at 0.45 V. Some beneficial effects of a dry membrane are that both methanol crossover rate and water electro osmotic drag flux are reduced, compared to those of a fully hydrated membrane. Thus, at an acceptable IR loss from the high membrane resistance of a partially dried membrane, better fuel efficiency and less water loss are obtained. With total cell weight kept constant, these derived benefits result in higher cell energy efficiency and higher energy density.

One issue for the passive direct methanol fuel cells is water loss from the cathode side, which, in the passive cell, is open to the atmosphere. Water transport into the cathode occurs in two different modes, namely by diffusion and electro-osmotic drag through the polymer electrolyte membrane. Both of these processes move water from the cell anode to the cathode in an operating direct methanol fuel cell.

Water transport by diffusion is dominant when the cell is at an open circuit condition or is operated at a low cell current density such that water activity at the cathode side is less than that on the anode side, which is in contact with an aqueous methanol solution. However, at the higher current density expected in an operating fuel cell water accumulates at the cathode from the oxygen electro-reduction process and, most importantly, from electro-osmotic drag.

Water transported across the membrane from anode to cathode in an operating methanol fuel cell is exclusively driven by electro-osmotic drag. The commercially available membranes currently used for direct methanol fuel cells are poly-(perfluorosulfonic acid) (PFSA) membranes, Nafion or Dow membranes, for example. The water electro-osmotic drag coefficient for these membranes, which is defined as the number of water molecules dragged across the membrane by one proton, is 2 to 3 at room temperature. For one methanol molecule that is electro-oxidized at the anode, six protons are produced. Each of these protons "drags" 2 to 3 molecules of water when they migrate from the anode to the cathode so that 12 to 18 molecules of water move from the anode to the cathode for each methanol molecule consumed. If the water that emerges on the cathode side is not efficiently recovered and returned to the anode side, the passive methanol fuel cell system would incur a large water imbalance and water loss that would limit the output energy density and applications for passive methanol fuel cell devices.

In accordance with one aspect of the present invention, water loss for the passive direct methanol fuel cells is minimized by using different anode and cathode electrode backings. By using a highly hydrophilic anode backing that tends to retain water and a highly hydrophobic cathode electrode backing that tends to exclude water, water can be moved backward from the cell cathode to the cell anode by a hydrostatic force arising from the hydrophobicity gradient between the two electrode backings. Hydrophobicity and hydrophilicity characteristics can be enhanced by coating the cathode and anode backings with appropriate materials that are well known. In an exemplary embodiment, the cathode is coated with PTFE to be hydrophobic and the anode is coated with a Nafion N1200EW ionomer solution to be hydrophilic. With a hydrophilic anode backing and a hydrophobic cathode backing, the total capillary force that drives water from the cathode side to the anode side of the membrane can be as high as 3 atmospheres.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An air breathing direct methanol fuel cell operated comprising:
    a liquid methanol reservoir;
    a membrane electrode assembly (MEA);
    a conductive cathode assembly contacting the MEA, permeable to air and directly open to atmospheric air; and
    a conductive anode assembly contacting the MEA, permeable to methanol and arranged directly adjacent the liquid methanol reservoir and connected to contact liquid methanol from the liquid methanol reservoir.

2. The air breathing direct methanol fuel cell according to claim 1, further including:

a cathode current collector contacting the conductive cathode assembly for distributing air over the conductive cathode assembly; and a anode current collector contacting the conductive anode assembly for distributing methanol over the conductive anode assembly.

3. The air breathing direct methanol fuel cell according to claim 1, further including:

a housing defining a container for the liquid methanol reservoir and further defining a first recess for accepting a first unit cell assembly of the MEA, conductive cathode and anode assemblies, and cathode and anode current collectors, where the recess has at least one opening therethrough to the container; and a cover plate compressing the first unit cell assembly within the first recess and further having at least one opening therethrough to the air.

4. The air breathing direct methanol fuel cell according to claim 1, wherein the anode and cathode current collectors are formed as perforated corrugated sheets.

5. The air breathing direct methanol fuel cell according to claim 4, wherein corrugations forming the anode current collector are oriented orthogonal to corrugations forming the flexible cathode current collector.

6. The air breathing direct methanol fuel cell according to claim 4, wherein the housing and the cover plate each define pressure rib members oriented orthogonal to corrugations on the anode current collector and the cathode current collector, respectively.

7. The air breathing direct methanol fuel cell according to claim 3, where the cover plate further includes a filter for filtering air to the conductive cathode assembly.

8. The air breathing direct methanol fuel cell according to claim 1, wherein the liquid methanol reservoir is a sponge effective to absorb methanol.

9. The air breathing direct methanol fuel cell according to claim 3, wherein the liquid methanol reservoir is a sponge effective to absorb methanol and the housing further includes a top plate for compressing the sponge within the container.

10. The air breathing direct methanol fuel cell according to claim 3, wherein the housing further defines a second recess for accepting a second unit cell assembly.

* * * * *